United States Patent Office 3,642,768
Patented Feb. 15, 1972

1

3,642,768
WATER-INSOLUBLE PHENYL-AZO-NAPHTHOL
DYESTUFFS
Joachim Ribka, Offenbach (Main), Germany, assignor to
Farbwerke Hoechst Aktiengesellschaft vormals Meister
Lucius & Bruning, Frankfurt am Main, Germany
No Drawing. Continuation-in-part of abandoned application Ser. No. 349,142, Mar. 3, 1964. This application
Jan. 8, 1969, Ser. No. 789,962
Int. Cl. C07c *107/08;* C09b *29/20*
U.S. Cl. 260—204                     3 Claims

ABSTRACT OF THE DISCLOSURE

Water-insoluble monazo dyestuffs consisting of 1-aminobenzene-4-carboxylic acid amide as diazo component and 1-(2',3'-hydroxynaphthoylamino)-2-methoxybenzene or -2-ethoxybenzene as coupling component. Said dyestuffs can be prepared in substance or on a substratum. The dyestuffs prepared in substance are valuable pigments which, for example, can be used for dyeing and printing textile materials and paper. The pigments are especially suitable for dyeing lacquers and natural or synthetic resins.

This application is a continuation-in-part application of our application Ser. No. 349,142 filed Mar. 3, 1964, now abandoned.

The present invention relates to new water-insoluble monazo-dyestuffs and to a process for preparing them; more particularly the invention relates to dyestuffs of the formula

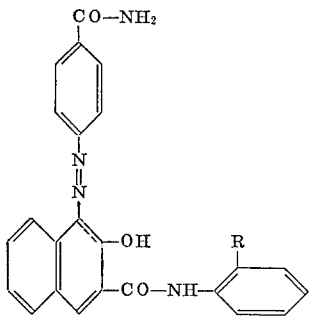

in which R represents methoxy or ethoxy, and to a process for preparing them by coupling or condensation according to known methods.

The dyestuffs can be prepared by coupling in substance, on the fiber or on another substratum. For preparing these dyestuffs in substance diazotized 1-aminobenzene-4-carboxylic acid amide is coupled with 1-(2',3'-hydroxynaphthoylamino)-2-methoxybenzene or 1-(2',3'-hydroxynaphthoylamino)-2-ethoxybenzene in an aqueous medium, preferably in the presence of a non-ionogenic, anion or cation active dispersion agent or in the presence of an organic solvent such as, for example, pyridine, quinoline or dimethyl formamide. When coupling in an aqueous medium it is advantageous to heat the coupling mixture for some time so as to obtain the pigment in the optimum granular condition, for example, to boil it in the presence of small quantities of an organic solvent such as, for example, pyridine, a hydrocarbon, such as dichlorobenzene, a phthalic acid dialkyl ester or a resin soap.

2

As azo component in the process of the present invention there can also be used Mannich bases of the formula

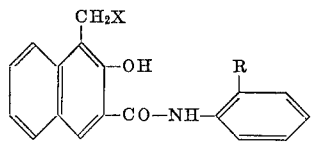

in which R represents methoxy or ethoxy and X represents the radical of a primary or secondary aliphatic amine, which may be substituted, or the radical of a hydrogenated heterocyclic nitrogen base.

In order to obtain particularly pure and fast dyeings it is advantageous to purify said dyestuffs, prepared by coupling in substance, by stirring them for some time, if desired with heating, for example with pyridine, dimethyl formamide or another suitable organic solvent. It is advantageous in some cases to grind the crude pigment in the presence of a suitable auxiliary grinding agent, in order to convert it into a finely dispersed form.

The preparation of the dyestuffs by coupling on fibers of natural or synthetic origin, such as for example cotton, regenerated cellulose, polyvinyl alcohol fiber, acetate silk or polyamide fibers, is carried out according to the known ice-color technique for dyeing and printing.

The coupling may also be carried out on other substrata for example on barium sulfate.

The preparation of the dyestuffs by condensation can be carried out in various ways. The carboxylic acid halide, for example, obtained by coupling diazotized 1-aminobenzene-4-carboxylic acid with 1-(2',3'-hydroxynaphthoylamino)-2-methoxybenzene or 1-(2',3'-hydroxynaphthoylamino)-2-ethoxybenzene, and treating with an agent which converts the carboxylic acid group into the carboxylic acid halide group, such as phosphorus trichloride, phosphorus pentachloride, phosphorus oxychloride, phosphorus pentabromide or thionyl chloride, is condensed with ammonia or agents yielding ammonia, for example ammonium salts; or the carboxylic acid halide, obtained by coupling diazotized 1-aminobenzene-4-carboxylic acid amide with 2,3-hydroxynaphthoic acid and treating with an agent which converts the carboxylic acid group into the carboxylic acid halide group, is condensed with 1-amino-2-methoxybenzene or 1-amino-2-ethoxybenzene, advantageously in an indifferent solvent, such as dichlorobenzene, chlorobenzene, toluene or dioxane.

The new dyestuffs prepared in substance are water-insoluble pigments distinguished by a good fastness to light and to solvents of the dyeings prepared with them.

The same fastness properties possess the dyestuffs produced on the fiber. The instant pigments are especially superior to the dyestuffs described in U.S. Pats. Nos. 3,127,391 and 2,006,211 being closely related as to their structure with respect to the fastness to bleeding of polyvinylchloride dyeings and with respect to the fastness to light of paper prints. The dyestuffs of the present invention possess, moreover, a clear and strong red tint which corresponds widely to the standard reds which are required for the produciton of multicolor prints of high quality.

The dyestuffs are suitable for dyeing or printing textile materials of vegetable or animal fibers, such as wool, cotton or linen or of semi-synthetic fibers, such as regenerated cellulose, for example, artificial silk or viscose, or of synthetic fibers, produced, for example, from polycondensation, polymerization or polyaddition products, according to the known pigment dyeing or pigment printing processes. The dyestuffs may also be added to spinning solutions, if desired, before polycondensation or polymerization. Furthermore, they are suitable for dyeing or printing paper, paperboard and for dyeing paper pulp, as well as for coloring lacquers and films of different composition, for example, of cellulose acetate, cellulose propionate or cellulose butyrate, nitrocellulose, polyvinyl acetate, polyvinyl chloride, copolymers of vinyl chloride and vinylidene chloride, polyethylene, polypropylene, polyamides, polyacrylonitrile or its copolymers, polyesters or alkyd resins.

The novel dyestuffs are also appropriate for dyeing natural or synthetic resins, for example epoxy resins, polyester resins, vinyl resins, polystyrene resins, alkyd resins or aldehyde resins, such as phenol, urea or melamine formaldehyde condensation products and for dyeing emulsions of synthetic resins, such as, for example, oil-in-water or water-in-oil emulsions. Furthermore it may be used for dyeing natural rubber-like materials, such as caoutchouc or guttapercha or synthetic vulcanizable materials, such as polychloroprene, olefinic polysulfides, polybutadiene or copolymers from butadiene and styrene or materials made from butadiene and acrylonitrile.

The following examples serve to illustrate the invention, but they are not intended to limit it thereto, the parts being by weight unless otherwise stated:

EXAMPLE 1

13.6 parts of 1 - aminobenzene - 4 - carboxylic acid amide are mixed, while stirring for some time, with 60 parts by volume of 5 N-hydrochloric acid. The mixture is then diluted with water and diazotized at 10° C. with 20 parts by volume of 5 N-sodium nitrite solution. After having been clarified by treating with kieselguhr at 25–30° C., the diazonium solution thus obtained is introduced in the course of 30–45 minutes into a clarified solution of 32 parts of 1–(2′,3′-hydroxynaphthoylamino)-2-ethoxybenzene in 1000 parts by volume of pyridine. After the coupling, the mixture is stirred for 1 hour, the dyestuff is filtered with suction and freed from the still adhering pyridine by distillation with steam, again suction filtered, washed and dried. A bluish-red pigment dyestuff is obtained.

The graphic printings, lacquerings, polyvinyl chloride dyeings and textile dyeings prepared with this dyestuff possess a pure bluish-red tint of good fastness to light and to solvents.

EXAMPLE 2

When operating according to the method described in Example 1 and using 30.5 parts of 1-(2′,3′-hydroxynaphthoylamino)-2-methoxybenzene instead of 32 parts of 1-(2′,3′-hydroxynaphthoylamino)-2-ethoxybenzene, a pigment dyestuff is obtained, which produces dyeings with a somewhat more bluish tint, but which possess similar fastness properties as the dyestuff described in Example 1.

EXAMPLE 3

23 parts of the monoazo-dyestuff, prepared by coupling 1 mol of diazotized 1-aminobenzene-4-carboxylic acid with 1 mol of 1-(2′,3′-hydroxynaphthoylamino) - 2 - ethoxybenzene are heated under reflux with 300 parts by volume of chlorobenzene, and the small quantity of water, which is present, is distilled off azeotropically. The mixture is cooled to 70° C., 2.5 parts by volume of dimethyl formamide and 5 parts by volume of thionyl chloride are added. The mixture is then gradually heated to boiling and refluxed until no more hydrochloric acid is formed. The carboxylic acid chloride of the dyestuff, which has formed, is filtered with suction and washed with chlorobenzene and petroleum ether. 5 parts of the carboxylic acid chloride are heated with 250 parts by volume of dioxane and 5 parts of ammonium acetate for 2½ hours on the steam bath while stirring. The amidation of the carboxylic acid chloride sets in very rapidly. The dyestuff formed is filtered wtih suction, washed with water and dried. The so obtained pigment corresponds to the dyestuff described in Example 1 as concerns its tint.

EXAMPLE 4

13.6 parts of 1 - aminobenzene - 4 - carboxylic acid amide are diazotized as described in Example 1. In the meantime 33 parts of 1-(2′,3′-hydroxynaphthoylamino)-2-ethoxybenzene are dissolved in the heat with 450 parts by volume of water and 42 parts by volume of 5 N-sodium hydroxide solution, and the solution is clarified. While stirring, this solution is dropped at 10–15° C. and within 30–45 minutes into the diazo solution to which 7 parts by volume of glacial acetic acid, 50 parts by volume of 2 N-sodium acetate solution and 2 parts of the reaction product of about 20 mols of ethylene oxide and 1 mol of stearyl alcohol have been added. The coupling being complete, aqueous solutions of 5 parts of resin soap and 3 parts of calcium chloride are added, and the mixture is boiled for 1 hour. The dyestuff thus obtained is filtered with suction, washed and dried. The dyeings produced with this dyestuff possess the same tints and fastness properties as those produced with the dyestuff obtained according to Example 1.

By varying the coupling conditions, the dyestuff can be prepared in another particle form, so that the tints are varied. If the coupling is performed according to the following method, a dyestuff is obtained which produces distinctly more yellowish red dyeings.

33 parts of 1-(2′,3′-hydroxynaphthoylamino)-2-ethoxybenzene are dissolved, as described above, in dilute aqueous sodium hydroxide solution. The clarified solution is precipitated at 0–3° C. by the addition of acetic acid in the presence of the reaction product of about 20 mols of ethylene oxide and 1 mol of stearyl alcohol and coupled at 35–40° C. and at a pH value of 6.5 with a diazo solution prepared according to the method of Example 1 from 13.6 parts if 1-aminobenzene-4-carboxylic acid amide. The coupling being complete, an aqueous solution of 5 parts of resin soap is first added to the mixture, and then 3 parts of calcium chloride are added. The mixture is boiled for 1 hour, the dyestuff is filtered with suction, washed and dried.

EXAMPLE 5

14 grams of 1 - (2′,3′-hydroxynaphthoylamino)-2-methoxybenzene are dissolved by boiling in 1 liter of softwater which contains 14 cc. of sodium hydroxide solution of 32.5% strength and 20 cc. of a wetting agent of the type of oil sulfonates. A cotton fabric is immersed into the aforedescribed solution and squeezed off between rollers to a liquid absorption of 100% of the weight of the goods to be treated. It is then dried by means of hot air or contact heat.

The fabric impregnated in this way is then immersed into the following bath and again squeezed off between rollers to a liquid absorption of 100% of the weight of the goods to be treated.

7.5 grams of 1-aminobenzene-4-carboxylic acid amide are diazotized as described in Example 1 and stirred into 1 liter of water which contains 1 gram of the reaction product of about 20 mols of ethylene oxide and 1 mol of octadecyl alcohol and which together with the acid of the diazotization bath contains such a quantity of acetic acid as is sufficient for neutralizing 14 cc. of sodium hydroxide solution of 32.5% strength (18.5 cc. of acetic acid of 50% strength). The fabric is then rinsed in water, treated for 15 minutes at 95° C. with 1 gram of the reaction product of about 10 mols of ethylene oxide and 1 mol of nonyl phenol and 3 grams of sodium carbonate per liter of water. Subsequently it is rinsed and dried.

There is obtained a red dyeing possessing good fastness properties.

I claim:
1. The water-insoluble monoazo-dyestuff of the formula
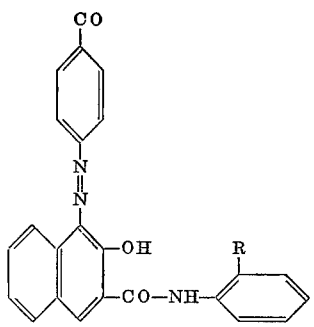
wherein R represents methoxy or ethoxy.
2. The dyestuff of the formula
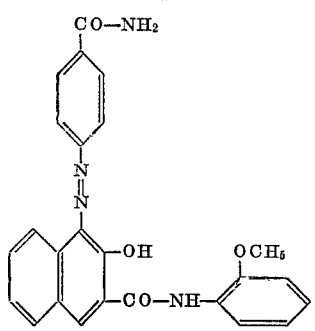
3. The dyestuff of the formula
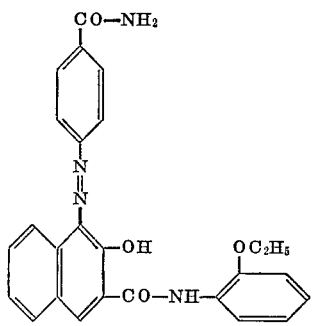
References Cited
UNITED STATES PATENTS
2,006,211  6/1935  Fischer _____ 260—203 X
3,127,391  5/1964  Neave _____ 260—204
FOREIGN PATENTS
889,739  9/1953  Germany _____ 260—204
CHARLES B. PARKER, Primary Examiner
C. F. WARREN, Assistant Examiner
U.S. Cl. X.R.
8—4, 5, 7, 41 R, B, C, 50, 51

Disclaimer 3,642,768.—*Joachim Ribka*, Offenbach (Main), Germany. WATER-INSOLUBLE PHENYL-AZO-NAPHTHOL DYESTUFFS. Patent dated Feb. 15, 1972. Disclaimer filed Oct. 25, 1974, by the assignee, *Hoechst Aktiengesellschaft*.

Hereby enters this disclaimer to claims 1 and 2 of said patent.

[*Official Gazette June 10, 1975.*]